UNITED STATES PATENT OFFICE.

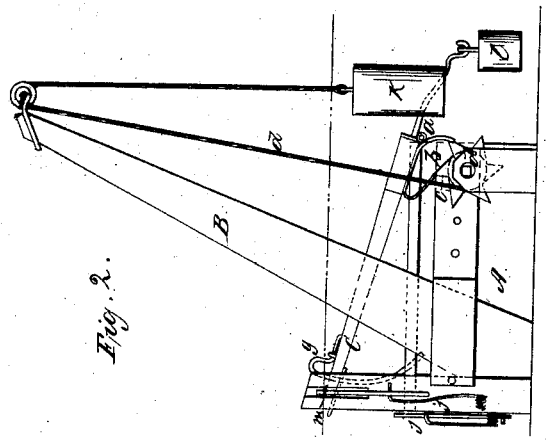
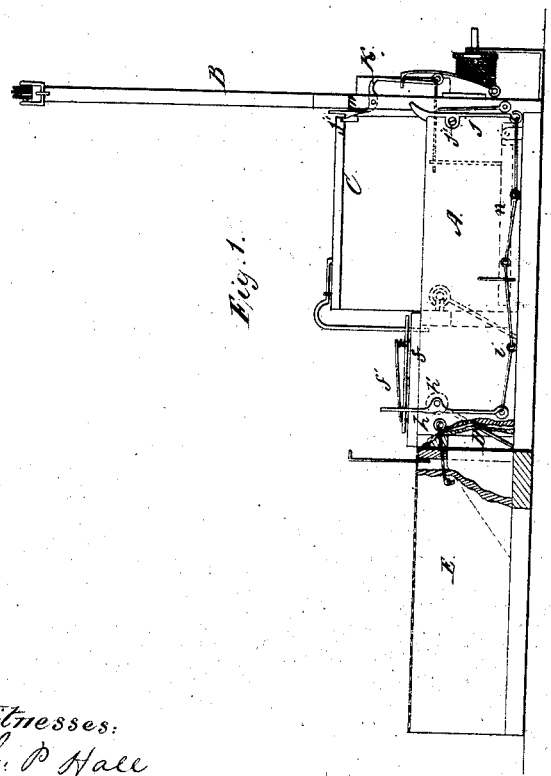
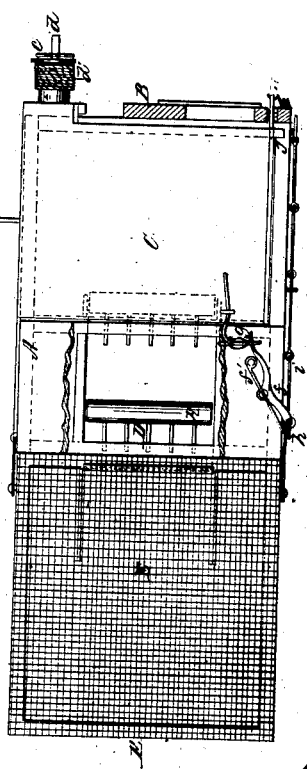

J. M. FLAUTT, OF REEDSBURG, WISCONSIN.

IMPROVEMENT IN ANIMAL-TRAPS.

Specification forming part of Letters Patent No. 45,595, dated December 27, 1864.

*To all whom it may concern:*

Be it known that I, J. M. FLAUTT, of Reedsburg, in the county of Sauk and State of Wisconsin, have invented a new and Improved Animal-Trap; and I do hereby declare that the following is full, clear, and exact description thereof, which will enable others skilled in the art to make and use the same, reference being had to the accompanying drawings, forming part of this specification, in which—

Figure 1 represents a sectional side elevation of my invention. Fig. 2 is an end view of the same. Fig. 3 is a sectional plan or top view of the same.

Similar letters of reference indicate like parts.

This invention consists in arranging, in the passage leading from the trap to the cage and connected with the trap-door, a hinged gate in such a manner that the animal in passing from the trap to the cage locks itself in, and at the same time resets the trap. The mechanism by which this object is accomplished is of a peculiar novel character, and consists of a lever connected to the axle of the trap-door, and connected by a chain or cord with the spring-catch which holds the trap-door closed, in combination with a latch, which is operated by the action of a tappet projecting from the edge of the trap-door in such a manner that when the trap-door goes down the lever is released and the gate is allowed to swing open, but when the animal caught in the trap passes through the gate said lever is turned, and by its connection with the spring-catch holding the trap-door said door is released, causing it to reset itself and to lock the gate.

A represents the box of my trap, made of wood or any other material, and of any convenient size.

The lid or trap-door C is connected to the rear edge of the trap by a hinge, $a$, and it is provided with an anchor-escapement, $b$, the the points of which engage with the escapement-wheel $c$. This wheel is secured to an axle, $d$, on which a rope, $d'$, winds, which extends over a pulley in the end of an upright, B, and a weight, $k$, suspended from said rope, has a tendency to impart to said shaft $d$ a rotary motion in the direction of the arrow marked near it in Fig. 2.

The door C is opened by the action of a weight, $l$, attached to an arm, which extends from its rear edge, and if it is open the escapement $b$ is in such a position in relation to the wheel $c$ that the weight $k$ has a tendency to close the door. It is retained, however, by the spring-catch $m$, which extends under a lip, $j'$, projecting from the front edge of the same, and which extends down and connects by suitable rods and levers with the tilting platform $n$, so that when an animal steps upon said platform the catch $m$ is released and the door closes. A spring-catch, $j$, over the lip $j'$, retains the same when closed, and it is not allowed to swing open until this spring-catch releases the lip.

The lower end of the catch $j$, which has its fulcrum on a pivot, $j^*$, connects by a rope or chain, $i$, with a lever, $h$, which is firmly secured to the axle $h'$, on which the gate D swings. This gate is situated in the passage leading from the trap A to the cage E, and when the lever $h$ is not locked, said gate is free to open in the direction of the arrow marked near it in Fig. 1, allowing the animal to enter the cage. When the trap-door is open, the lever $h$ is locked by a latch, $f$, which is pivoted to the upper edge of the trap A and subjected to the action of a spring, $f'$, but when the trap-door closes a tappet, $g$, by striking against the shank of the latch, releases the lever $h$, and the gate D is free to swing open; but if the trap-door is closed by the action of an animal stepping on the tilting platform in the trap, said animal, finding himself locked in, will attempt to escape through the gate D, and as it passes through this gate the lever $h$ is turned in the direction of the arrow marked near it in Fig. 1, the spring-catch $j$ is caused to release the trap-door, and the latter opens by the action of the weights $k$ and $l$. As soon as this takes place, the latch $f$ drops behind the lever $h$, and the gate is locked, so that the animal cannot return from the cage to the open trap.

By this arrangement any number of animals can be caught in the same trap, requiring no attention to the resetting of the same until the weight $l$ has run down.

A slide, $o$, on the edge of the cage serves to close the opening leading from the trap to said cage. When a sufficient number of animals have been caught, the slide is depressed, and the cage can now be removed for the purpose of killing the animals.

I do not claim operating the doors of a trap by means of a suspended weight and a cord acting in conjunction with an escapement; but I claim—

In combination with the trap-door C, upright B, weighted line $d$, wheel $c$, escapement $b$, gate D, levers $h\ j$, and chain $i$, all constructed and operating as specified, the catch $f$, spring $f'$, and tappet $g$, so arranged in connection with the aforesaid gate D and door C as to lock the gate D shut when the trap-door C is open, and release the gate when the door is shut, in the manner and for the purposes explained.

J. M. FLAUTT.

Witnesses:
 J. P. HALL,
 WM. F. MCNAMARA.